United States Patent [19]

Ebert, Jr.

[11] 4,241,261
[45] Dec. 23, 1980

[54] CIRCUIT CONTROL TO LIMIT POWER DRAIN OF AUXILIARY POWER SUPPLY IN UPS SYSTEM

[75] Inventor: Harry K. Ebert, Jr., Hackettstown, N.J.

[73] Assignee: Bell Telephone Laboratories, Incorporated, Murray Hill, N.J.

[21] Appl. No.: 953,881

[22] Filed: Oct. 23, 1978

[51] Int. Cl.³ ............................................. H02J 9/06
[52] U.S. Cl. ...................................... 307/45; 307/64; 328/155
[58] Field of Search ...................... 307/44, 46, 64, 65, 307/66, 228, 232, 282, 295, 48, 45, 60, 87, 262; 328/127, 128, 155

[56] References Cited

U.S. PATENT DOCUMENTS

| | | | |
|---|---|---|---|
| 3,991,319 | 11/1976 | Servos | 307/64 |
| 4,010,381 | 3/1977 | Fickenscher | 307/66 |

OTHER PUBLICATIONS

"High-speed Astable Ramp Generator," E. S. Hoyt, IBM Technical Disclosure Bulletin, vol. 19, No. 2, Jul. 1976, pp. 418-419.

*Primary Examiner*—L. T. Hix
*Assistant Examiner*—S. D. Schreyer
*Attorney, Agent, or Firm*—Alfred G. Steinmetz

[57] ABSTRACT

An uninterruptible power supply includes a digital control circuit to control the transfer of power from a primary and a secondary power source to a load circuit to be energized. The digital control circuit controls through digital techniques the relative phase angles of a primary power signal, a secondary power signal, and a load signal to advantageously minimize the power drain on an idling secondary power source when the primary power source is active and to minimize transients in the load signal when converting from one power source to another.

6 Claims, 6 Drawing Figures

CIRCUIT CONTROL TO LIMIT POWER DRAIN OF AUXILIARY POWER SUPPLY IN UPS SYSTEM

TECHNICAL FIELD

This invention is concerned with uninterruptible power supplies having a plurality of input power sources operative to supply a continuous power output irrespective of the condition of individual ones of the input sources. It is precisely concerned with a digital control arrangement permitting operation of the emergency source during normal operation at a very high efficiency.

BACKGROUND OF THE INVENTION

AC commercial power is often used as a primary power source to power communication and data processing equipment which utilize solid-state integrated circuit technology. These circuits are very sensitive to variations of the power signal from its desired standard waveform. Commercial AC power waveforms are subject to many variations from the standard waveform due to the demands of other users on the power line and other extraneous factors.

Undesirable power signal variations causing problems include overvoltage and undervoltage conditions, signal outages, and signal transients such as voltage spikes. These power signal variations may alter the stored data or the switching signals and in extreme cases may damage the solid-state circuitry. Transient and momentary outages may cause undetected damage in data areas which are not immediately apparent and eventually cause costly shutdowns due to damaged circuitry, disrupted communications, or introduce errors in computations.

To avoid these aforementioned problems, uninterruptible power supplies are utilized to isolate variations in the AC power signal from the equipment being powered and to supply continuous power to an output regardless of the actual performance of the basic commercial AC power signal.

One uninterruptible power supply system providing signal variation and signal outage protection to solid-state equipment is disclosed by H. Fickenscher et al in U.S. Pat. No. 4,010,381, issued Mar. 1, 1977, and assigned to the same assignee as the instant application. The uninterruptible power supply disclosed therein utilizes a three-port power coupling medium to couple two periodic power sources to a single load to be continuously energized. This coupling medium, as shown in FIG. 1, is embodied as a double-shunted, ferroresonant transformer 10 with two input windings 11 and 12 isolated from each other and each loosely coupled to a single output winding 13. Separate and independent power sources are connected to each of the two input windings 11 and 12. These power sources are operated in a cooperative manner to supplement each other as needed to maintain continuous power at the output winding. The load 14 coupled to the output winding 13 ideally does not distinguish between which of the two power sources is actively supplying power, whether singly or in combination, since the ferroresonant transformer arrangement provides isolation between the power sources and the load.

Under the direction of a central controller 15, as shown in FIG. 3, several modes of operation of an uninterruptible power supply 20 are possible. These modes are defined by the power sources selected either singly or in combination to supply power to the load. The uninterruptible power supply disclosed by Fickenscher et al normally operates in one of three distinct modes: a normal mode where a first external power source, normally commercial AC connected to the first input winding 21, supplies all the output power to the load 24; an internal mode where normally a battery-energized inverter 16 connected to the second input winding 22 supplies the output power to the load; or, third, a share mode where both power sources connected to both input windings 21 and 22 equally contribute to the output power supplied to the load 24. The share mode may operate for a substantial duration of time during periods when the commercial AC power is substandard, or merely during a transitory interval while switching between the normal and internal modes.

The ferroresonant transformer power medium of Fickenscher et al may be theoretically considered to be an inductively coupled system with an equivalent circuit as shown in FIG. 2. In such an inductively coupled system power flow from either input 31 or 32 to the output 33 is a function of the phase displacement between the signal at the input and the signal at the output. Hence, power flow from any input to the output of the coupling medium is regulated by controlling the phase angle at that input in an appropriate manner.

In the Fickenscher et al uninterruptible power supply control of the power derived by the output from the two sources is dependent upon the relative periodic signal phases of the commercial AC signal, the inverter signal output, and the output power signal. These signal phases are controlled by a signal phase control 15, as shown in FIG. 3, to achieve the desired selected modes of operation. If the commercial AC signal applied to winding 21 and the inverter output signal applied to winding 22 are in phase, they both supply power to the output winding 23.

In the normal mode of operation, however, it is desirable that the commercial AC signal supply all the power, and the inverter 16 supply no power to the output load 24. To achieve this desired condition during the normal mode, the inverter output signal must be in phase with the output power signal. Inverter 16 is run continuously and, whether it delivers power to the output or not, is totally dependent upon the relative phase angle of the inverter output signal at winding 22 and the output signal at winding 23. This phase angle control in Fickenscher et al is achieved through a transformer sensing winding 25 which senses the phase of the output power signal. Control circuitry 15 generates appropriately phased switch drive signals for switching devices of inverter 16 whereby the inverter output signal is brought into phase with the output signal on winding 23 so that it contributes no power to the output signal during the normal mode of operation. This idling condition improves the efficiency, and yet permits the uninterruptible power supply to switch sources rapidly. Control of power output of the reserve power source in its idling condition is critical to the ultimate overall efficiency of the uninterruptible power supply. Such a control should have a fast response and a high degree of accuracy.

Another method of controlling the signal phase of the inverter is disclosed in U.S. Pat. No. 3,991,319, issued Nov. 9, 1976 to G. H. Servos et al. This patent discloses an uninterruptible power supply with standby power provided by an inverter circuit powered by a direct-current voltage source. DC current supplied by the reserve DC voltage source to the inverter is monitored and utilized to control the phase of the inverter signal relative to the commercial line signal. The DC current monitored is converted to a voltage which in turn is used to adjust the signal phase. This requires the generation of a voltage signal having a direct proportional relation to the current which requires integration over a period of time. In many applications a faster response than that permitted by integration is required.

SUMMARY OF THE INVENTION

The present invention is embodied in a digital control system to control relative signal phases of input and output signals during a normal mode by monitoring the current supplied by the battery of the auxiliary source to the inverter power devices. This battery current flow is a function of the inverter power flow to the output which in turn reflects the relative phases of the two signals.

In the normal mode of operation of the uninterruptible power supply the phase angle of the signal output of the inverter relative to the phase angle of the output signal is controlled in response to this sensed battery current without the necessity of monitoring and comparing the specific phase angle of the inverter output and the output power signal. Monitoring of the power input to the inverter or the battery current flow is accomplished through a current probe and a cyclic integrator circuit which monitors the flow of current from the battery to the inverter power devices which may comprise silicon controlled rectifiers.

The term cyclic integration as used herein refers to a form of integration wherein the harmonics of the battery current output due to alternate switching of the inverter switching devices is integrated for a single cycle to determine deviation of the integrator output at the end of the cycle from the integrator output at the start of the cycle. Individual deviations of each cycle are digitized by the control circuitry and utilized to modify a digital count to control the phasing of the inverter switching devices. Cyclic integration of the harmonic of the battery current output permits a fast response to changes in the inverter phase superior to the response of control circuits in the prior art. It allows determination of the increase or decrease of the power flow from the battery within one cycle of operation.

DETAILED DESCRIPTION

Figure 1:
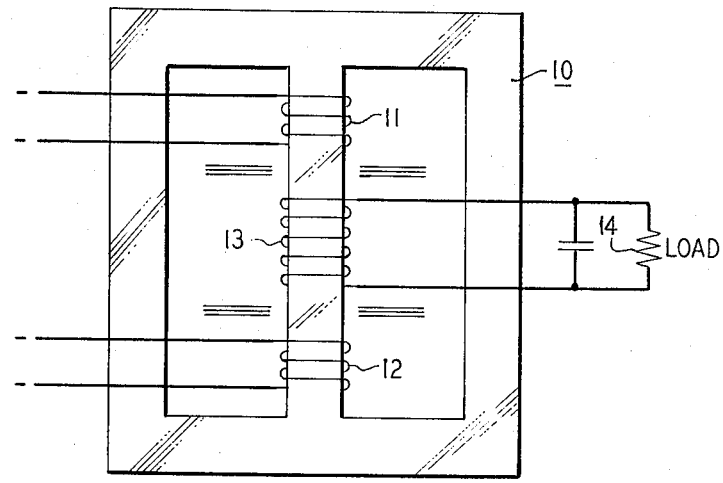
FIG. 1 is a schematic of a suitable ferroresonant transformer suitable for use as a power coupling medium in the invention.
Figure 2:
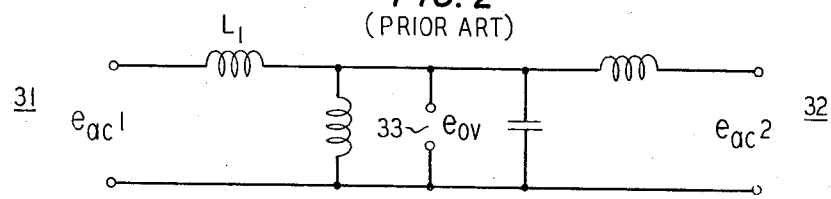
FIG. 2 is a schematic of an equivalent circuit of the ferroresonant transformer of FIG. 1.
Figure 3:
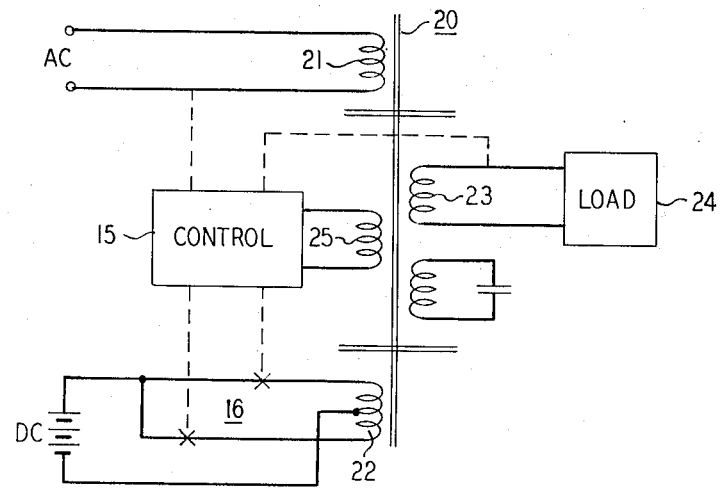
FIG. 3 is an uninterruptible power supply having control features as disclosed in the Fickenscher et al reference discussed above.
Figure 4:
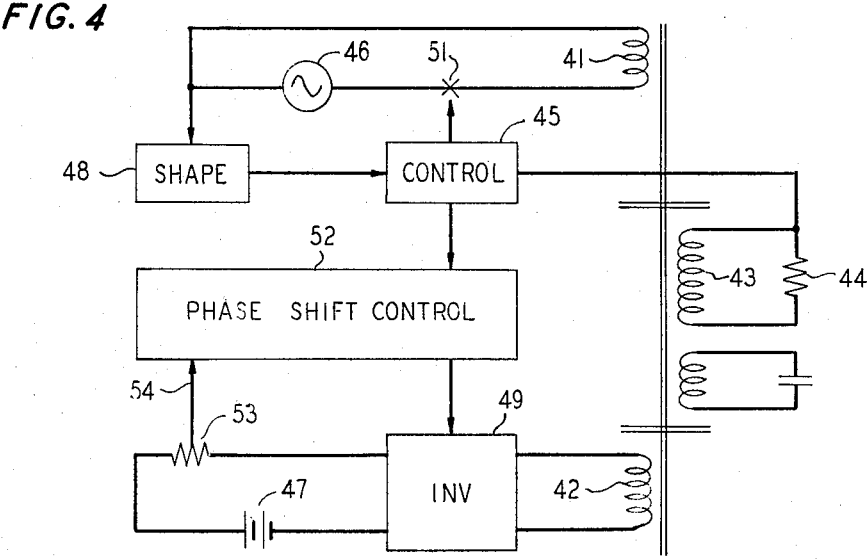
FIG. 4 is an uninterruptible power supply showing in block form a control system according to the principles of the invention.

An uninterruptible power supply including phase shift control circuitry embodying the principles of the invention is shown in block diagram form in FIG. 4. The commercial AC power signal, which is the normal power source 46, is coupled to one of the primary windings 41, which is coupled to output winding 43 to energize the load 44. The reserve power supplied by battery 47 is coupled to an inverter circuit 49 which in turn inverts the DC and applies it to winding 42, which is also coupled to winding 43. A shaping circuit is coupled to the commercial AC source 46 and applies a square wave in phase with the commercial AC to a control circuit 45. The control circuit 45 monitors the state of the AC signal and the output power signal applied to the output load 44. It operates to supply synchronizing signals to the phase shift control 52 and control transmission of power between the reserve power source and the output. Phase shift control 52 additionally monitors the current flow from the battery 47 to SCR switches of inverter 49 by utilizing a small resistance 53 whose voltage is applied via lead 54 to the phase shift control. The phase shift control 52 cyclically integrates the second harmonic of this current and operatively responds thereto to null power flow through the resistance 53 by adjusting the timing of drive signals to the SCR switches of inverter 49 to align the phase of the inverter generated signal with the output signal of the power supply.

Except for power outages and undesirable short-term transients in the commercial AC power in temporary brownouts, the primary power source 46 supplies virtually all the power to the load 44. The main purpose of the battery powered inverter 49 is to supply smoothing and temporary substitution power during momentary outages. To accomplish this function the inverter 49 must respond instantaneously to failures of the commercial AC power. Hence, the inverter is operated in what is identified as an "idling" mode meaning that the SCR switching devices coupling the battery 47 to the input winding 42 are continuously switched at a frequency which is the same as the frequency of the commercial AC power source 46. However, to have the power supply operate at a high efficiency, it is essential that the inverter 49 deliver no power to the output load 44 during this idling mode. As discussed herein above, the transmission of power through the uninterruptible power supply disclosed herein is determined by the phase lag of the output signal waveform with respect to the input signal waveform. Hence, to insure that the inverter delivers no power, its output signal must be in phase with the output power signal waveform. One method of doing this is to replicate the output signal waveform and use control circuitry to operate the inverter in phase therewith. However, in the present circuit an improved arrangement is used wherein the output current of the battery is monitored and a phase shift control operates the inverter at a selected phase displacement so that no power is drawn from the battery.

Figure 5:
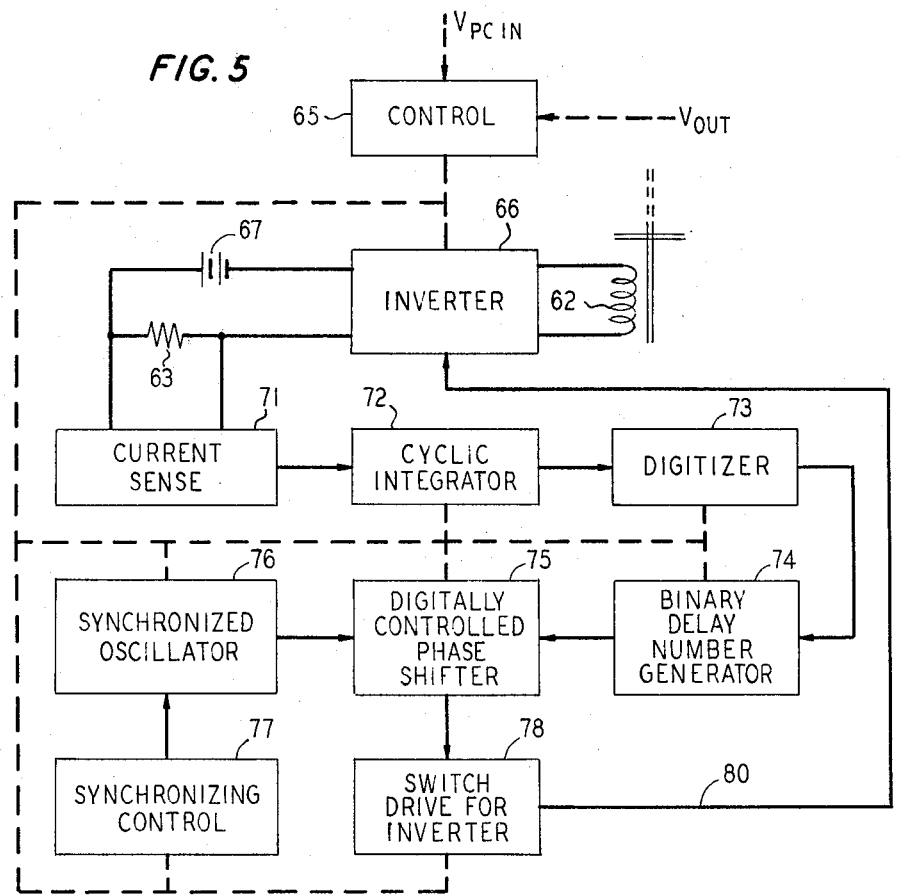
FIG. 5 is a block diagram of a digital phase shift control system for an uninterruptible power supply embodying the principles of the present invention.

A block diagram arrangement of a suitable phase shift control according to the principles of the invention to achieve this directive is shown in FIG. 5. Only a portion of the power supply is shown in FIG. 5, namely, the phase shift control of the inverter 66, its transformer winding 62, and its connection to the control circuit 65. The undisclosed portions may be considered to be identical to those portions shown in FIG. 4.

Since uninterruptible power supply systems are known to those skilled in the art and have been disclosed, such as in the aforementioned Fickenscher et al patent, it is not believed necessary to detail the entire control circuit.

The phase control circuitry shown in FIG. 5 operates in synchronism with the primary power source. Hence, the dotted line coupled from the control to the various components of the phase shift control is shown to diagrammatically indicate this synchronism. As indicated in FIG. 4 and again in FIG. 5, the reserve power source is the DC battery 67 which is coupled to an inverter 66 whose SCR switching devices invert the battery power into a periodic signal which is applied to the transformer winding 62. In order to achieve the ideal idling condition, power flow from the battery 67 to the inverter 66 must be nulled. If the battery current output is nulled, power flow from the battery 67 is eliminated.

Battery current output is monitored by means of a sensing resistor 63, which is coupled between the output terminal of the battery 67 and the switching devices of inverter circuit 66. The voltage across the resistor 63 is applied to the current sense circuit 71 where it amplifies the signal to a usable voltage level. This voltage signal representing the sense current is applied to a cyclic integrator circuit 72.

Applicant has determined that the battery current flow which would occur from power being delivered from the battery to the SCR switching devices of the inverter 66 has a predominant second harmonic characteristic. Hence, determination of power flow from the battery to the inverter 66 cannot be simply made by a magnitude detection inasmuch as the harmonic may have large instantaneous magnitudes at certain points in a periodic cycle with, however, no average power being drawn from the battery 67 during the total cycle as the average value of the cyclic waveform is zero. Therefore, instantaneous current detection cannot be used to control the lead or lag of the inverter signal phase since selected peaks of the second harmonic may be appreciable whereas in reality the average power is zero. Hence, an average current determination is utilized to determine if power is flowing out of the battery. However, using conventional methods of determining the average will entail a significant time delay and render a desired fast response impossible. Conventional averaging techniques normally include a filter to integrate the signal. However, the time delay entailed by such integration techniques renders the response to the phase control circuit too slow to be really suitable for the application.

Hence, in order to determine a usable signal representative of the average to control the appropriate lead or lag of the inverter signal, a cyclic integration technique is utilized to integrate the current for exactly one period of operation. This cyclic integration determines if the output signal level of the integrator during this one period returns to the signal level at which it started. Hence, the average current may be determined over cycles of operation relatively close to each other and with a high speed and high resolution which is a significant improvement over conventional integration techniques.

The output of the cyclic integrator 72, which is indicative as to whether a power flow is coming from the battery 67, is applied to a digitizer circuit 73 which responds to changes at the output of the cyclic integrator 72 to generate up-digit or down-digit signals or no-change signals which are responsive to the cyclic integrator 72.

The digitizer 73 generates up or down count signals in response to the cyclic integrator 72 which signals are applied to actively increase or decrease a binary delay number which is generated by the binary delay number generator 74. The binary number contained therein is the signal or count which controls the signal phase of the inverter signal output.

The binary number generated by the binary delay number generator is applied to a digitally controlled phase shifter 75. This phase shifter 75 generates a square wave which lags the square wave of the conventional AC and is in phase with the output load signal. This square wave is derived from the square wave output of a synchronized oscillator 76. The digitally controlled phase shifter 75 accepts the square wave generated by oscillator 76 and delays it by an amount in time controlled by the binary delay number.

This phase delayed square wave is applied to a switch drive circuit 78. The output of the switch drive 78 is two oppositely phased drive signals applied to drive the SCR switching devices of the inverter 66.

The basic square wave from which this drive signal is derived is generated by the synchronized oscillator 76 which is responsive to the synchronizing control 77. During normal operation of the power supply the synchronizing control 77 maintains the oscillator signal output and operations of the phase shift control in synchronism with the primary AC power signal source.

As described above, a central controller to the power supply monitors the primary commercial AC power signal, the DC reserve power source signal, and the output power signal and institutes appropriate corrective action upon a deficiency or failure of the primary AC power source. When the power supply is operating normally, that is, all power supplied by the primary AC power source, the control operates the inverter in a lossless condition which is called the "idling" condition. Hence, the signal output of the inverter is synchronized with the primary AC power signal and is in phase with the output power signal. The inverter is run in the idling mode so that it may respond to failure of the AC power source quickly.

Figure 6:
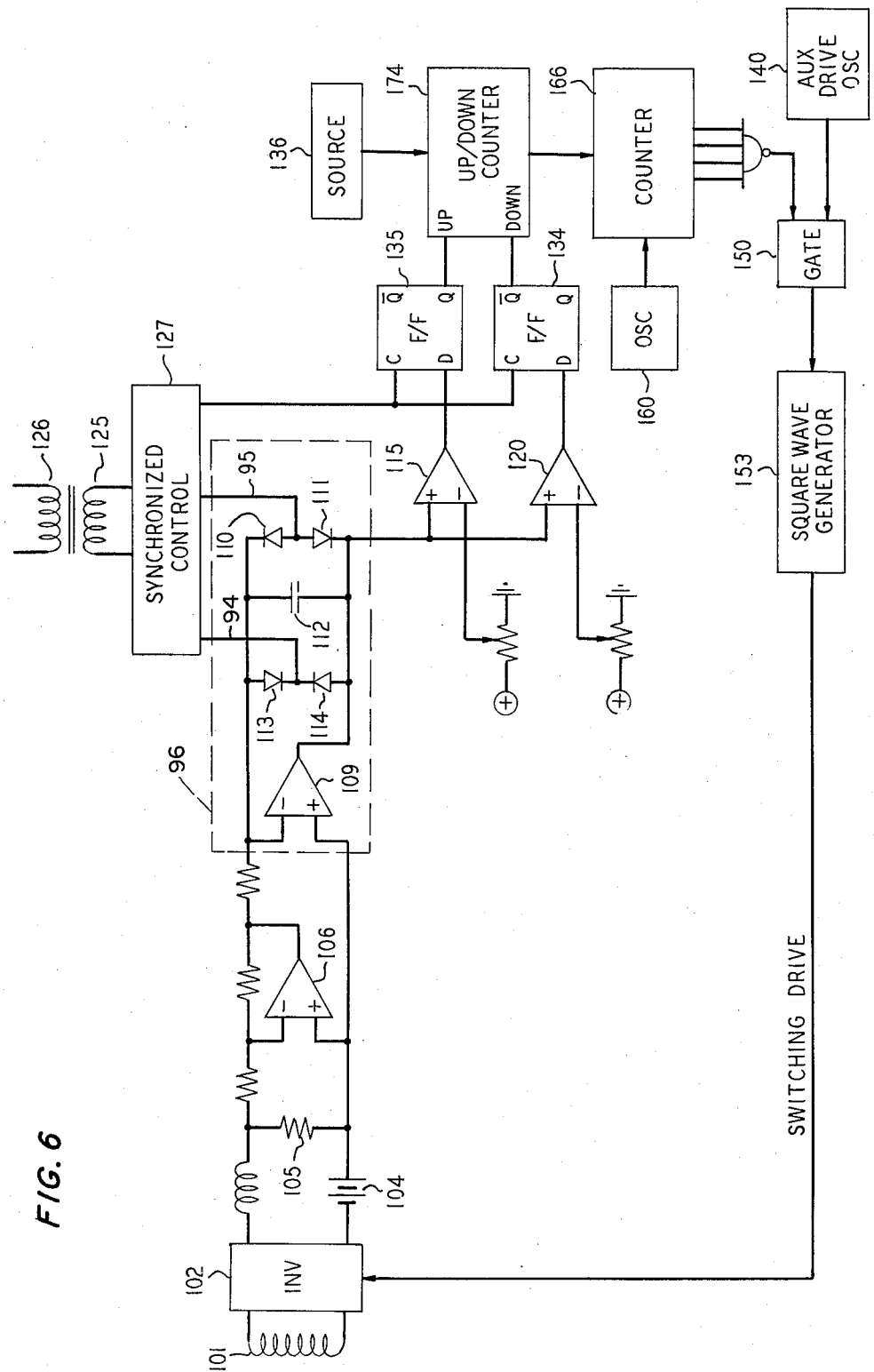
FIG. 6 is a detailed logic diagram and schematic of a digital control system for an uninterruptible power supply embodying the principles of the present invention.

The basic frequency source in the phase shift control circuit, shown in FIG. 6, is operated in synchronism with the primary AC power signal. In order to achieve this synchronism, the AC power signal must be monitored and signals derived therefrom which in turn are applied to the logic circuitry in the phase shift control, as shown in FIGS. 5 and 6, to assure its synchronous operation. To derive these synchronizing signals, the AC power signal is monitored by using a linear transformer 126. This monitored signal appearing on the winding 125 is applied to a synchronizing control 127 from which is derived a synchronizing signal which is phase related to the primary AC power signal. This synchronizing signal is applied to synchronize operation of the logic circuitry of the phase shift circuit with the primary AC power signal.

The idling lossless condition of the inverter is assured by monitoring power flow from the battery coupled to the inverter output through the inverter switching devices. Accordingly, as shown in FIG. 6, the inverter 102 coupled to the winding 101 is powered by a battery source 104. Current from the battery 104 which supplies power to the inverter is coupled to a sensing resistor 105 which is coupled so that the output current flow from the battery to the inverter passes through the sensing resistor 105. Sensing resistor 105 is selected with a very low resistance value to minimize power loss. The voltage drop across the resistor 105 will probably not exceed 50 millivolts.

The voltage drop across the resistor 105 is amplified by an operational amplifier 106 to a level of about 5 volts and the output of operational amplifier 106 is applied to the input of a comparator operational amplifier 109.

Since the current drawn from the battery during the normal mode of operation has a predominantly second harmonic signal with a significant peak value, due to the alternate switching of the inverter switching devices a mere detection of the current magnitude is not sufficient for controlling the idling mode of the inverter. Hence, the average value of the current must be used. However, a conventional average of the second harmonic cannot be used because a high speed of response is essential to maintain the inverter in a proper idling mode. Hence, the average detected is not the typical average derived via an integrating filter. Rather, in accord with the invention herein, it is the integral of a sinusoid over exactly one period or cycle of operation and comprises a comparison of terminal signal levels with signal levels at the start of the period monitored.

A cyclic integrator 96 including comparator 109 is operated in synchronism with the commercial AC signal. This synchronizing control is exercised by the synchronizing control circuit 127 which essentially provides oppositely phased control signals in output leads 94 and 95 to control the clamping and operation of the cyclic integrator 96. Two clamping paths, including diodes 110, 111, and diodes 113, 114, respectively, clamp the output of operational amplifier 109 to its inverting input. An integrating capacitor 112 is also connected between the inverter input and the output of the operational amplifier 109.

The output 94 of the synchronizing control 127 is connected to the common electrical node of diodes 113 and 114. The oppositely phased output 95 of the synchronizing control 127 is connected to the common electrical node of the two diodes 110 and 111. The cyclic integrator is operated so that it integrates one cycle of the harmonic signals thereby determines the DC level component. It is apparent that the charging of the integrating capacitor 112 is controlled by the clamping signals applied via leads 94 and 95 to control the conductivity of the diodes 110, 111, 113, and 114. A high signal on lead 95 and a low signal on lead 94 forward biases the clamping diodes and permits the discharge of the integrating capacitor 112. Conversely, a high signal on lead 94 coupled with a low signal on lead 95 back biases diodes 110, 111, 113, and 114 and allows the integrating capacitor 112 to charge in response to the sensed signal across the sensing resistor 105.

The output signal of the cyclic integrator 96 is applied in parallel to the noninverting input of the operational amplifier 115 and the inverting input of operational amplifier 120. The two operational amplifiers 115 and 120 are biased as shown by the potentiometers 119 and 122, respectively, to respond to positive signal and negative signal outputs of the cyclic integrator, respectively. The outputs of operational amplifiers 115 and 120 are applied to the D inputs of the two D-type flip-flops 135 and 134, respectively. Both D-type flip-flops 135 and 134 are clocked by a signal output of the trigger signal generator 128 so that digitizing output signals are generated in synchronism with the commercial AC power source. The up-digit signal is derived from the output of the D-type flip-flop 135 and the down-digit signal is derived from the complementary output of the D-type flip-flop 134.

The digitizing outputs of flip-flops 135 and 134 are applied to up and down inputs, respectively, of an up-down counter 174 which is preset with an initial count supplied by source 136. A digital count is developed therein which is utilized to control the phase difference between the commercial AC power signal and the inverter output signal. This count is periodically altered in response to the up-digit and down-digit digitizing signals developed in response to the action of the cyclic integrator 96.

The counting action of the counter 174 is synchronized by a synchronizing signal which is supplied by the synchronizing control 127. Control of the count in the counter 174 is controlled by its up-down input which is responsive to the output of flip-flops 135 and 134. Once the up-down direction is established, the synchronizing signal supplied by control 127 acts as a clock to step the count contained therein in an upward or downward direction to generate the digital phase control number.

The basic drive signal to drive the inverter switching devices is generated by a frequency source 140 which signal appears at the output lead 189 of that source. This signal at lead 189 is in phase with the commercial AC power signal since the frequency source is synchronized by the output of the synchronized control 127. However, before it is applied to the switching devices of inverter 102 it is phase delayed by an amount controlled by the number in the counter 174. The phase delay count contained in the counter 174 is applied to counter 166 wherein it is counted down by a free-running oscillator 160. The count output of the counter 166 is applied to a NOR gate 164 whose output in turn is applied to a gate 150. When the input to NOR gate 164 is all ZEROS, that is, the count is reduced to zero by oscillator 160, the output of NOR gate 164 enables the gate 150. The output of frequency source 140 which has been delayed by the periodically nontransmitting gate 150 is now applied to square wave generator 153. The output of sqaure wave generator 153 is a phase delayed signal to drive the switching devices of inverter 102 so they draw no power from battery 104.

I claim:

1. A control system to control power flow in an uninterruptible power supply having a transformer, with a first and second input to accept a primary power source and a reserve power source, respectively, and an output to accept a load to be energized;

said reserve power source including an inverter circuit to generate a periodic voltage signal, said inverter circuit having an inverter input to accept a DC voltage source and an inverter output coupled to the second input of said transformer, said inverter circuit having operative characteristics, which introduce harmonics into DC current supplied by the DC voltage source to the inverter;

the control system including, a cyclic integrator connected at the inverter input to monitor the DC current supplied by the DC voltage source to the inverter circuit and including an energy storage device to integrate the DC current monitored for one cycle of a harmonic, quantizing means for generating a digit responsive to a change in an energy level on said energy storage device; and phase control means responsive to said quantizing means and coupled for controlling a signal phase of a signal generated by the inverter circuit with respect to a signal phase of the primary signal source, said phase control means including an up/down counter responsive to said quantizing means to alter a count therein to reflect the said change in energy level, signal generating means to generate a drive signal and delay means to delay the drive signal in response to a count stored in said up/down counter and coupled to apply the drive signal as delayed to power switching devices of the inverter circuit, whereby an inverter circuit output signal is generated at a phase relative to the phase of the primary power signal so that the inverter circuit draws no net power from the DC voltage source.

2. A control system to control power flow through a transformer in an uninterruptible power supply wherein;

a primary power source is coupled to a first input of the transformer, a reserve power source is coupled to a second input of the transformer and a load is coupled to an output of the transformer, said reserve power source comprising;

an inverter circuit having an inverter output coupled to the second input of said transformer, an inverter input of said inverter circuit adapted to accept a DC voltage source, the control system including a cyclic integrator coupled to monitor current flow from the DC voltage source to the inverter input and operative for integrating a single cycle of a harmonic of a current output signal of the DC voltage source, said cyclic integrator comprising;

a charge storage capacitor and gating means to enable said charge storage capacitor to accumulate charge for a single cycle of a harmonic, quantizing means responsive to the accumulated charge on the charge storage capacitor to generate binary digits responsive to a change of accumulated charge during a single cycle of a harmonic output signal; and switch drive means to generate drive signals for switching devices of the inverter circuit, including an oscillator synchronized with the primary power source and a digital signal delay circuit coupling an output of the oscillator to the switching devices, the digital signal delay circuit including a bidrectional counter responsive to said quantizing means in order to control a signal delay interval therein, whereby a phase angle of an output signal of the inverter is adjusted in accord with a count contained in the bidirectional counter.

3. A control circuit to control power flow through a transformer in an uninterruptible power supply;

the transformer having first and second inputs and an output, the first input adapted to receive a primary periodic voltage signal, an inverter circuit coupled to the second input and having an inverter input adapted to receive a DC voltage source;

the control circuit operative to adjust a phase of a voltage signal generated by the inverter circuit relative to a phase of the primary periodic voltage signal so that the inverter circuit draws no power from the DC voltage source, the control circuit comprising an oscillator circuit synchronized to be in phase with the primary periodic voltage signal;

a digitally controlled signal delay circuit connected to couple an output of the oscillator circuit to drive switching devices of the inverter;

the digitally controlled signal delay circuit including an up/down counter and operative to delay a signal in proportion to a count contained therein;

a cyclic integrator including a storage capacitor and coupled to monitor current flow from the DC voltage source to the inverter input of the inverter circuit and operative for integrating a single cycle of a harmonic current signal output of the DC voltage source and accumulating a resulting charge on the storage capacitor;

quantizing means coupled to the storage capacitor and responsive to a polarity of the accumulated charge thereon to generate a numerical digit;

the quantizing means coupled to the up/down counter and operative to apply the numerical digit to alter a count therein and hence, alter a delay interval of a signal passing through the digitally controlled signal delay circuit;

whereby a phase of a signal generated by the inverter is altered with respect to a phase of the primary periodic signal waveform so that current flow from the DC voltage source to the inverter input of the inverter is nulled.

4. A control circuit as defined in claim 3 wherein the quantizing means comprises:

a first comparator responsive to a first polarity of a voltage on said storage capacitor; a second comparator responsive to a second polarity, opposite the first polarity of a voltage, on said storage capacitor; a first bistable circuit responsive to the first comparator to generate a first numerical digit to represent the first polarity; a second bistable circuit responsive to the second comparator to generate a second numerical digit to represent the second polarity; said up/down counter coupled to be responsive to the first and second numerical digits to alter its count in order to reflect a polarity of a signal of said storage capacitor.

5. A control circuit to control power flow through a power coupling transformer of an uninterruptible power supply;

a first input of the transformer adapted to receive a primary periodic voltage signal; a second input of the transformer adapted to receive a reserve periodic voltage signal and an output of the transformer adapted to be coupled to a load to be energized by the power supply;

an inverter circuit operative to generate the reserve periodic voltage signal and being coupled to the second input of the transformer, the inverter circuit further having an inverter input adapted to receive a DC voltage source;

the control circuit comprising:

an oscillator circuit, synchronizing means coupled to synchronize the oscillator circuit with the primary periodic voltage signal;

a drive control circuit for utilizing an output of the oscillator to drive power switching devices of the inverter and including a digital signal delay circuit for delaying signals supplied by the oscillator by an interval proportional to a count in a counter included in the digital signal delay circuit;

current monitoring means coupled for monitoring current flow from the DC voltage source to the inverter input of the inverter circuit;

a cyclic integrator coupled for integrating a single cycle of a harmonic signal due to current flow through the current monitoring means;

quantizing means responsive to the cyclic integrator and operative to generate a digit related to a polarity of an integrated signal supplied by the cyclic integrator; and the digit output of the quantizing means coupled to alter a count in the counter and change a delay interval in the digital signal delay circuit, whereby the phase of the inverter is altered so it draws no current from the DC voltage source.

6. A control circuit as defined in claim 5 wherein said quantizing means comprises:

a first comparator coupled for responding to a positive signal output of the cyclic integrator; a second comparator coupled for responding to a negative signal output of the cyclic integrator; a first bistable circuit responsive to the first comparator to generate a positive digit at an output and a second bistable circuit responsive to the second comparator to generate a negative digit at an output; outputs of the first and second bistable circuits being coupled to modify a count in said counter.

* * * * *